United States Patent
Zhang et al.

(10) Patent No.: US 10,520,766 B2
(45) Date of Patent: Dec. 31, 2019

(54) DISPLAY PANEL AND MANUFACTURING METHOD THEREFOR

(71) Applicants: Xiamen Tianma Micro-Electronics Co., Ltd., Xiamen (CN); Tianma Micro-Electronics Co., Ltd., Shenzhen (CN)

(72) Inventors: Long Zhang, Xiamen (CN); Poping Shen, Xiamen (CN); Lei Han, Xiamen (CN); Qiong Song, Xiamen (CN)

(73) Assignees: XIAMEN TIANMA MICRO-ELECTRONICS CO., LTD., Xiamen (CN); TIANA MICRO-ELECTRONICS CO., LTD., Shenzhen (CN)

(*) Notice: Subject to any disclaimer, the term of this patent is extended or adjusted under 35 U.S.C. 154(b) by 617 days.

(21) Appl. No.: 14/983,207

(22) Filed: Dec. 29, 2015

(65) Prior Publication Data
US 2016/0187708 A1    Jun. 30, 2016

(30) Foreign Application Priority Data
Dec. 31, 2014  (CN) .......................... 2014 1 0852598

(51) Int. Cl.
*G02F 1/1335*    (2006.01)

(52) U.S. Cl.
CPC .................. *G02F 1/133528* (2013.01); *G02F 2001/133565* (2013.01); *G02F 2202/022* (2013.01); *G02F 2202/043* (2013.01); *Y10T 428/1023* (2015.01); *Y10T 428/1041* (2015.01)

(58) Field of Classification Search
CPC ... G02F 1/133528; G02F 2001/133565; G02F 2202/022; G02F 2202/043; Y10T 428/1041; Y10T 428/1023; Y10T 428/1009
See application file for complete search history.

(56) References Cited

U.S. PATENT DOCUMENTS

| | | | | |
|---|---|---|---|---|
| 4,824,882 A | * | 4/1989 | Nakamura | G02B 5/3033 252/585 |
| 6,042,974 A | * | 3/2000 | Iwata | G02B 5/201 347/106 |
| 6,449,028 B1 | * | 9/2002 | Grupp | G02F 1/1339 349/127 |
| 2004/0138408 A1 | * | 7/2004 | Harris | C08G 73/10 528/354 |
| 2009/0167991 A1 | * | 7/2009 | Young | G02F 1/1336 349/69 |

(Continued)

FOREIGN PATENT DOCUMENTS

| | | |
|---|---|---|
| CN | 1356585 A | 7/2002 |
| CN | 100388022 C | 5/2008 |

(Continued)

*Primary Examiner* — Sophie Hon
(74) *Attorney, Agent, or Firm* — Faegre Baker Daniels LLP

(57) ABSTRACT

A display panel and a manufacturing method therefor are disclosed. The display panel includes a first substrate, a second substrate disposed opposite to the first substrate, and at least one of a first organic film layer disposed on the first substrate, and a second organic film layer disposed on the second substrate, where at least one of the first organic film layer or the second organic film layer is an polyimide doped with a dichromatic organic dye.

16 Claims, 5 Drawing Sheets

(56) References Cited

U.S. PATENT DOCUMENTS

2014/0361220 A1* 12/2014 Kawamura ........ C09K 19/3066
                                                              252/299.63

FOREIGN PATENT DOCUMENTS

| | | | |
|---|---|---|---|
| JP | 0764090 A | | 3/1995 |
| JP | 07064090 A | * | 3/1995 |
| JP | 2002250924 A | * | 9/2002 |
| WO | WO-2014083634 A1 | * | 6/2014 |

* cited by examiner ns DISPLAY PANEL AND MANUFACTURING METHOD THEREFOR

CROSS-REFERENCE TO RELATED APPLICATION

This application claims priority to Chinese Application No. 201410852598.7, filed Dec. 31, 2014, which is herein incorporated by reference in its entirety.

TECHNICAL FIELD

The present disclosure relates to the field of display technologies and, in particular, to a display panel and a manufacturing method therefor.

BACKGROUND

A Liquid Crystal Display (LCD) is a display manufactured with liquid crystal material. An LCD has characteristics such as being light weight, thin, having low power consumption, and displaying a large amount of information.

A polarizer is essential for the liquid crystal display. As shown in FIG. 1 which is a schematic diagram showing a structure of a polarizer in the related art, the polarizer includes a release film 1, an adhesive layer 2, a first protecting film 3, a polarizing film 4, a second protecting film 5 and a protecting plate 6 which are stacked in sequence, where the first protecting film 3 and the second protecting film 5 are typically made of Tri-cellulose Acetate (TCA), and the polarizing film 4 is typically made of Polyvinyl Alcohol (PVA). The existing polarizing films include an iodine polarizing film and a dyed polarizing film, where the iodine polarizing film is formed by stretching polyvinyl alcohol doped with iodine molecules, and the dyed polarizing film is formed by stretching polyvinyl alcohol doped with dichromatic organic dye. Since the polyvinyl alcohol is easily dissolvable in water, the first protecting film 3 and the second protecting film 5 are attached respectively to both sides of the polarizing film 4 to improve reliability of the existing polarizer, in this way, there are too many films in the polarizer, and requirements for light-weight and thin liquid crystal display devices cannot be fulfilled. Moreover, the existing polarizing film shrinks easily because of effects of heat and humidity and hence is susceptible to warping. As for the iodine polarizing film, since iodine molecules are likely destroyed in an environment of high temperature and high humidity, the iodine polarizing film has poor durability, and requirements for manufacturing processes of a liquid crystal display device cannot be fulfilled.

SUMMARY

Embodiments of the disclosure provide a display panel and a manufacturing method therefor, to avoid the excessive films in the polarizer, the susceptibility to warping of the polarizer and the poor durability of the polarizer due to an effect of an environment of high temperature and high humidity.

Embodiments of the disclosure provide a display panel including:
a first substrate;
a second substrate disposed opposite to the first substrate;
a first organic film layer disposed on the first substrate; and/or
a second organic film layer disposed on the second substrate,
where at least one of the first organic film layer and the second organic film layer is an organic film layer of polyimide doped with a dichromatic organic dye.

Embodiments of the disclosure provide a method for manufacturing the display panel, including:
forming a first substrate;
forming a first organic matter layer on a first surface of the first substrate, where a polyimide prepolymer doped with a dichromatic organic dye is mixed in the first organic matter layer; and
exposing the first organic matter layer to polarized Ultraviolet (UV) light to form a first organic film layer of polyimide doped with a dichromatic organic dye.

In the display panel and the manufacturing method therefor, according to embodiments of the disclosure, the first organic film layer is disposed on the first substrate and the second organic film layer is disposed on the second substrate, where at least one of the first organic film layer and the second organic film layer is an organic film layer of polyimide doped with a dichromatic organic dye. Since both the polyimide and the dichromatic organic dye have a light alignment property, the function of polarizer can be achieved by the polyimide doped with the dichromatic organic dye after light alignment; moreover, the polyimide has strong resistance to high temperature and high humidity, and the alignment of the polyimide can be achieved without stretching, in this way, the protecting film and the adhesive layer can be eliminated, thereby reducing the thickness of the polarizer, improving the reliability of the polarizer and avoiding the warping phenomenon of the polarizer, resulting in good durability of the polarizer.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

To make the above and other characteristics and advantages of the disclosure more apparent to those of ordinary skills in the art, exemplary embodiments of the disclosure will be described in detail below with reference to accompanying drawings, in which.

Figure 1:
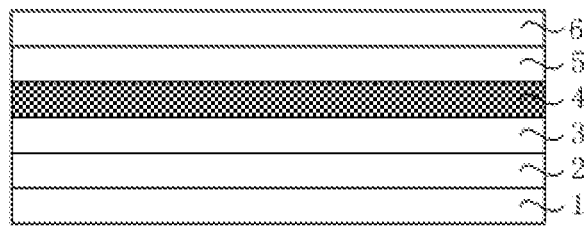
FIG. 1 is a schematic diagram showing a structure of an existing polarizer.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further illustrated in detail below in conjunction with the accompanying drawings and embodiments. It may be understood that specific embodiments described herein are merely for explaining the disclosure rather than limiting the disclosure. Merely partial structures associated with the disclosure rather than all structures are illustrated in the accompanying drawings for ease of description, and the same or similar reference signs in the accompanying drawings represent same or similar components or components having same or similar functions.

Figure 2:
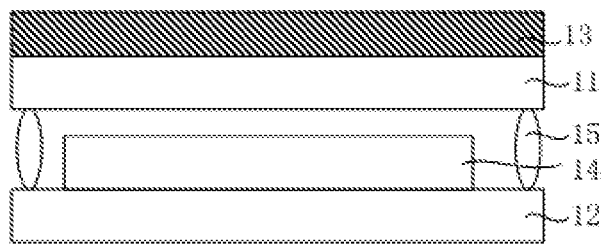
FIG. 2 is a schematic diagram showing a structure of a display panel, according to embodiments of the disclosure.

A display panel, which is an organic light-emitting display panel or a liquid crystal display panel, is provided according to embodiments of the disclosure. As shown in FIG. 2 which is a schematic diagram showing a structure of a display panel, according to embodiments of the disclosure, the display panel includes a first substrate 11, a second substrate 12 disposed opposite to the first substrate 11, and a first organic film layer 13 disposed on the first substrate 11, where the first organic film layer 13 is an organic film layer of polyimide doped with a dichromatic organic dye.

The display panel can be an organic light-emitting display panel, the second substrate 12 may be an array substrate, and the first substrate may be a color filter substrate, a cover glass, a cover lens or the like. The organic light-emitting display panel may further include an organic light-emitting layer 14 disposed between the first substrate 11 and the second substrate 12, and a frame sealant 15 formed at peripheral inner surfaces of the first substrate 11 and the second substrate 12 to seal the organic light-emitting layer 14, so that the organic light-emitting layer 14 is protected from humidity and collision. The first organic film layer 13 is disposed on the first substrate 11, for example on a surface away from the second substrate 12 of the first substrate 11 to prevent ambient light or external light incident onto the organic light-emitting display panel from reflecting by the first organic film layer 13.

In the display panel, according to embodiments of the disclosure, the first organic film layer, which is an organic film layer of polyimide doped with a dichromatic organic dye, is disposed on the first substrate. Since both the polyimide and the dichromatic organic dye have a light alignment property, the function of polarizer can be achieved by the polyimide doped with the dichromatic organic dye after light alignment; moreover, the polyimide has strong resistance to high temperature and high humidity, and the alignment of the polyimide can be achieved without stretching, in this way, the protecting film and the adhesive layer can be eliminated, thereby reducing the thickness of the polarizer, improving the reliability of the polarizer and avoiding the warping phenomenon of the polarizer, resulting in good durability of the polarizer.

Figure 3:
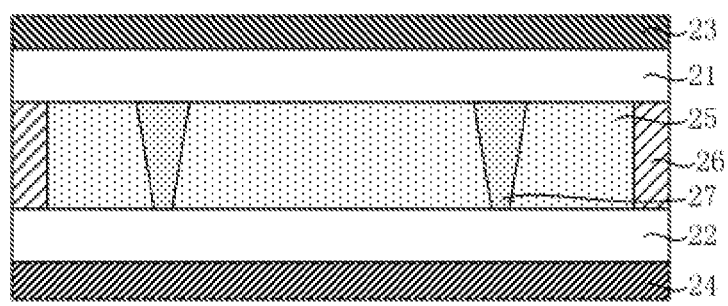
FIG. 3 is a schematic diagram showing a structure of another display panel, according to embodiments of the disclosure.

FIG. 3 is a schematic diagram showing a structure of another display panel, according to embodiments of the disclosure. As shown in FIG. 3, the display panel includes a first substrate 21, a second substrate 22 disposed opposite to the first substrate 21, a first organic film layer 23 disposed on the first substrate 21, and a second organic film layer 24 disposed on the second substrate 22, where the first organic film layer 23 and the second organic film layer 24 are of polyimide doped with a dichromatic organic dye.

In embodiments, a polyimide prepolymer doped with a dichromatic organic dye is mixed in a first organic matter layer and a second organic matter layer, which are then exposed to polarized UV light to form the first organic film layer 23 and the second organic film layer 24, so that molecules in the dichromatic organic dye are orientationally aligned in the polyimide, and eventually the polarizer is formed after prebaking, baking and curing the first organic film layer 23 and the second organic film layer 24. The polarizer can transform natural light into polarized light. The dichromatic organic dye has different light absorptivity along directions of a long axis and a short axis of the organic dye molecules to generate different colors. In some embodiments, the dichromatic organic dye is an azo dye, an anthraquinone dye, a biphenyl dye, a three benzene diazine and derivative dye, a single methylidyne or multiple methylidyne dye, a poly ring dye or an organic dye having a dichroic ratio greater than 7. In the embodiments, the polyimide has stronger resistance to high temperature and high humidity than the polyvinyl alcohol, and a polarization function of the polarizer can be achieved without stretching. In this way, compared with the polarizer in the related art, the polarizer with the first organic film layer 23 and the second organic film layer 24 having a polarization function, according to embodiments of the disclosure, has a reduced thickness, avoids the need for TCA protecting layer and adhesive layer, improves its reliability, and eliminates the warping phenomenon.

The display panel shown in FIG. 3 may be a liquid crystal display panel. In this case, the first substrate 21 may be a color filter substrate, and the second substrate 22 may be an array substrate. In some embodiments, the liquid crystal display panel further includes a liquid crystal layer 25 disposed between the first substrate 21 and the second substrate 22, spacers 27 formed between the first substrate 21 and the second substrate 22, and a frame sealant 26 adhering to the first substrate 21 and the second substrate 22 to form a liquid crystal box together with the first substrate 21 and the second substrate 22. The spacers 27 are spaced from each other in the liquid crystal box to form the thickness of the liquid crystal box, to prevent a display failure due to deformation of the liquid crystal box under pressure.

It is understood by those skilled in the art that the display panel described here is merely for interpreting rather than limiting the disclosure. Embodiments are for illustration, and the disclosure is applicable to various existing display panels. In this way, an exemplary structure of the display panel shown in FIG. 3 does not form a limitation to the disclosure.

Figure 4A:
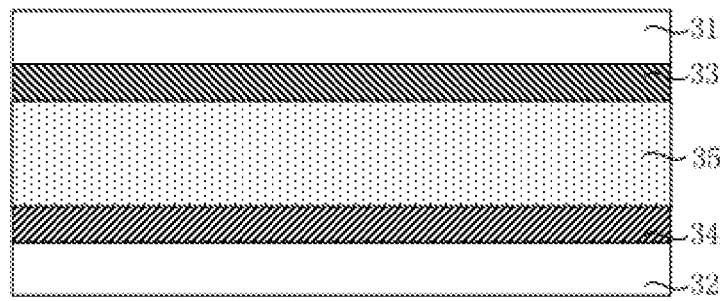
FIGS. 4A to 4D are schematic structural views showing positions of a first organic film layer and a second organic film layer, according to embodiments of the disclosure.

FIGS. 4A to 4D are schematic structural views showing positions of a first organic film layer and a second organic film layer, according to embodiments of the disclosure. As shown in FIG. 4A, each of a first organic film layer 33 and a second organic film layer 34 is disposed on an inner surface of the display panel. For example, the first organic film layer 33 may be disposed on a surface of a first substrate 31 close to a second substrate 32, or may be an organic film layer (which may be a doped organic film layer) added to the film structure of the first substrate 31. The second organic film layer 34 may be disposed on a surface of the second substrate 32 close to the first substrate 31, or may be an organic film layer added to the film structure of the second substrate 32. When both the first organic film layer 33 and the second organic film layer 34 are disposed on the inner surfaces of the display panel, the first organic film layer 33 and the second organic film layer 34 are respectively disposed on both sides of a liquid crystal layer 35 to play a role of polarizer. In addition, since the first organic film layer 33 and the second organic film layer 34, which have a polarization function, are of polyimide doped with a dichromatic organic dye and have good resistance to high temperature and high humidity, the first organic film layer 33 and the second organic film layer 34 can be disposed inside the liquid crystal box. In the related art, however, the polarizing film made of PVA cannot be disposed inside a liquid crystal box because PVA is easily affected by an environment of high temperature and humidity.

In some embodiments, on the structure of the display panel shown in FIG. 4A, a first planarization layer, which may be embodied by the first organic film layer 33, is disposed on the color filter substrate, and a second planarization layer, which may be embodied by the second organic film layer 34, is disposed on the array substrate.

Figure 4B:
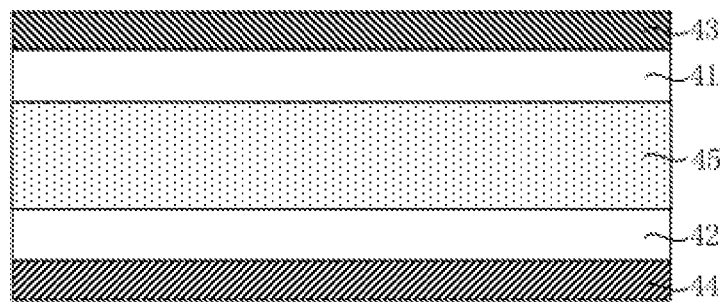

Alternatively, as shown in FIG. 4B, each of a first organic film layer 43 and a second organic film layer 44 is disposed on an outer surface of the display panel, i.e., the first organic film layer 43 is disposed on a surface away from a second substrate 42 of a first substrate 41, and the second organic film layer 44 is disposed on a surface away from the first substrate 41 of the second substrate 42.

Figure 4C:
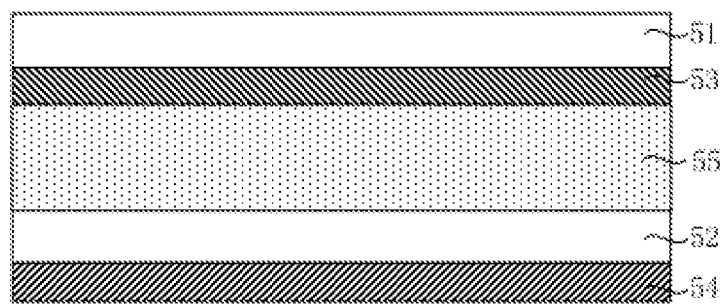

Alternatively, as shown in FIG. 4C, a first organic film layer 53 is disposed on the inner surface of the display panel, i.e., the first organic film layer 53 is disposed on a surface of a first substrate 51 close to a liquid crystal layer 55, and a second organic film layer 54 is disposed on an outer surface of the display panel, i.e., the second organic film layer 54 is disposed on a surface away from the liquid crystal layer 55 of a second substrate 52.

Figure 4D:
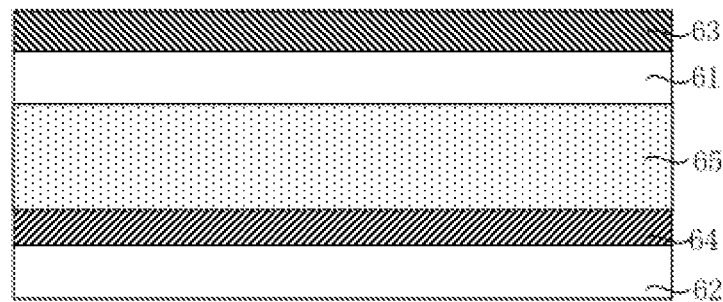

Alternatively, as shown in FIG. 4D, a first organic film layer 63 is disposed on an outer surface of the display panel, i.e., the first organic film layer 63 is disposed on a surface away from a liquid crystal layer 65 of a first substrate 61, and a second organic film layer 64 is disposed on the inner surface of the display panel, i.e., the second organic film layer 64 is disposed on a surface of a second substrate 62 close to the liquid crystal layer 65.

It is noted that FIGS. 4A to 4D exemplarily show a relative position relationship between the first organic film layer and the second organic film layer. Depending on various structures of the display panel, there can be various film structures on the first substrate and the second substrate in the display panel. The film structures on the first substrate and the second substrate in embodiments are not described in detail herein, as long as both the first organic film layer and the second organic film layer are of polyimide doped with a dichromatic organic dye and are respectively disposed on both sides of the liquid crystal layer. In this way, FIGS. 4A to 4D should not be regarded as a limitation to the embodiments. Moreover, some irrelevant films on the first substrate and the second substrate in the display panel are not shown in FIGS. 4A to 4D for ease of description, and this should not be a limitation to the embodiments.

Figure 5:
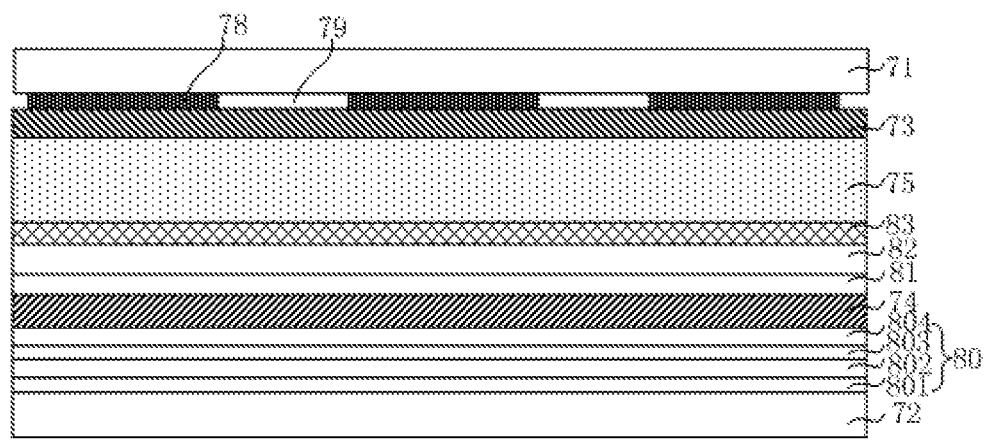
FIG. 5 is a schematic diagram showing a structure of another display panel, according to embodiments of the disclosure.

On the basis of the structures of the display panel shown in FIGS. 4A to 4D, modifications may further be made to the display panel, according to embodiments of the disclosure. Hereinafter, contents of unchanged parts of the display panel shown in FIGS. 4A to 4D are not described. FIG. 5 is a schematic diagram showing a structure of another display panel, according to embodiments of the disclosure. As shown in FIG. 5, a black matrix 78, color filters 79 and a first organic film layer 73 are disposed on the inner side of a color filter substrate 71. The black matrix 78 has a plurality of openings, and the color filters 79 are disposed in the openings of the black matrix 78, respectively. The first organic film layer 73 is disposed on a film including the color filters 79 and the black matrix 78. A thin-film transistor layer 80, a second organic film layer 74, a first transparent conductive film 81, an insulating layer 82 and a second transparent conductive film 83 are disposed in sequence on the array substrate 72 in a direction from the array substrate 72 to the color filter substrate 71. The thin-film transistor layer 80 includes a gate electrode layer 801, a gate insulating layer 802, a semiconductor layer 803 and a source-drain metal layer 804. The first transparent conductive film and the second transparent conductive film may be made of Indium Tin Oxide (ITO), Indium Zinc Oxide (IZO), a combination of ITO and IZO, or other transparent conductive materials. In some embodiments, the first organic film layer 73 may be embodied as the first planarization layer disposed on the color filter substrate, or may be an additionally added organic film layer, while the second organic film layer 74 may be embodied as the second planarization layer disposed on the array substrate, or may be an additionally added organic film layer. The first organic film layer, the second organic film layer and the additionally added organic film layer may be doped organic film layers. When the second organic film layer 74 is embodied by the additionally added organic film layer, the second organic film layer 74 may be disposed on the gate electrode layer 801, the gate insulating layer 802, the source-drain metal layer 804, a second planarization layer 24, the first transparent conductive film 81, the insulating layer 82 or the second transparent conductive film 83.

FIG. 5 exemplarily shows a structure of the display panel. Depending on various structures of the display panel, there are various film structures on the color filter substrate 71 and the array substrate 72 in the display panel. In this way, FIG. 5 should not be regarded as a limitation to the embodiments.

Further, a display device is provided according to embodiments of the disclosure, and the display device includes the display panel in any one of the above embodiments. The display device may be a liquid crystal display device including the above display panel and a backlight unit. For example, the display device may be one of a mobile phone, a desktop computer, a laptop computer, a tablet computer and an electronic paper. Of course, the display device may alternatively be another display device such as an organic light-emitting display device.

In the display panel and the display device, according to embodiments of the disclosure, the first organic film layer is disposed on the first substrate and the second organic film layer is disposed on the second substrate, where at least one of the first organic film layer or the second organic film layer is an organic film layer of polyimide doped with a dichromatic organic dye. Since both the polyimide and the dichromatic organic dye have a light alignment property, the function of polarizer can be achieved by the polyimide doped with the dichromatic organic dye after light alignment; moreover, the polyimide has strong resistance to high temperature and high humidity, and the alignment of the polyimide can be achieved without stretching, in this way, the protecting film and the adhesive layer can be eliminated, thereby reducing the thickness of the polarizer, improving the reliability of the polarizer and avoiding the warping phenomenon of the polarizer, resulting in good durability of the polarizer.

Figure 6:
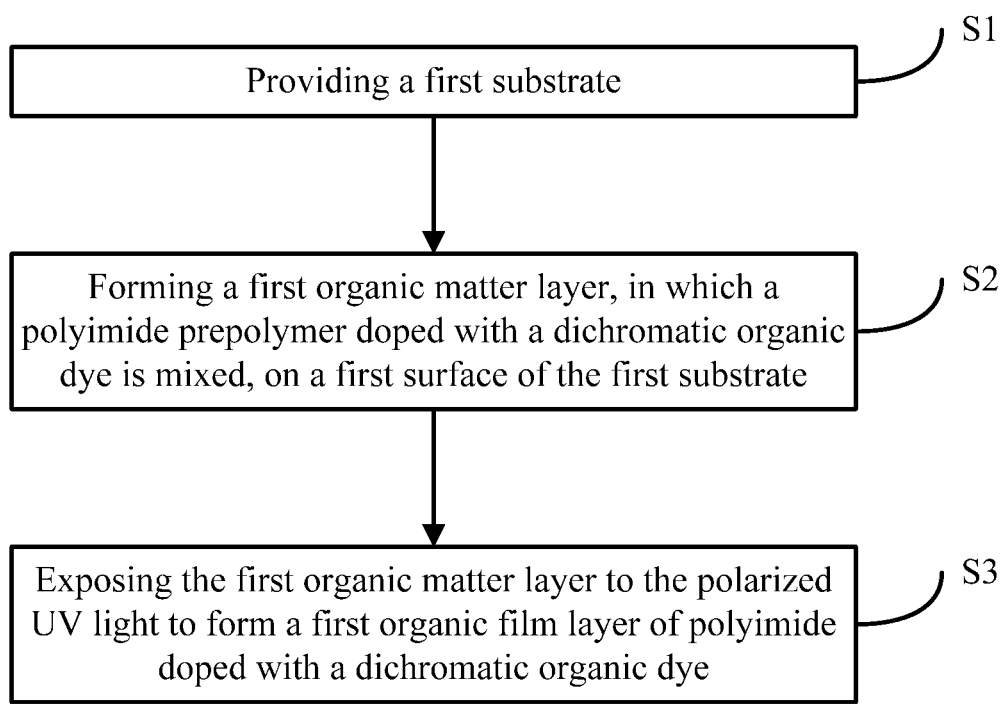
FIG. 6 is a flow chart of a method for manufacturing a display panel, according to embodiments of the disclosure.

FIG. 6 is a flow chart of a method for manufacturing a display panel, according to embodiments of the disclosure. In combination with the structure of the display panel shown in FIG. 2, the method for manufacturing the display panel may be adopted to manufacture an organic light-emitting display panel. Particularly, the method for manufacturing the display panel includes the following Steps S1-S3.

In Step S1, a first substrate is provided.

The first substrate may be a color filter substrate, a cover glass, a cover lens or the like.

In Step S2, a first organic matter layer, in which a polyimide prepolymer doped with a dichromatic organic dye is mixed, is formed on a first surface of the first substrate.

A mixture of an organic matter and the polyimide prepolymer doped with a dichromatic organic dye is coated on the first surface of the first substrate. The dichromatic organic dye is an azo dye, an anthraquinone dye, a biphenyl dye, a three benzene diazine and derivative dye, a single methylidyne or multiple methylidyne dye, or a poly ring dye.

In Step S3, the first organic matter layer is exposed to the polarized UV light to form a first organic film layer of polyimide doped with a dichromatic organic dye.

The first organic matter layer is prebaked. The prebaking may be performed at a temperature in a range from 10° C. to 30° C. The prebaked first organic matter layer is exposed to the polarized UV light, so that the dichromatic organic dye is orientationally aligned in the first organic matter layer. Energy of the polarized UV light is in a range from 300 mj to 1000 mj and, in some embodiments, is in a range from 500 mj to 800 mj. In the case of such energy of the polarized UV light, the film of the polyimide has an optimum light alignment property, facilitating the orientational alignment of the azo dyes, in this way, an optimum polarization performance is achieved. Subsequently, the first organic matter layer subjected to the exposure to the polarized UV light is baked and cured, where the baking may be performed at a temperature in a range from 90° C. to 130° C. for 90 seconds to 120 seconds, and the curing may be performed at a temperature in a range from 210° C. to 230° C. for 20 minutes to 50 minutes. For example, the baking is performed at 130° C. for 120 seconds, or the curing is performed at 230° C. for 30 minutes.

Optionally, the method for manufacturing the display panel may further include forming a second substrate which may be an array substrate, forming an organic light-emitting layer on the array substrate, and forming a frame sealant layer disposed on the first substrate and surrounding the organic light-emitting layer, where the first substrate and the second substrate are laminated together through the frame sealant layer so that the organic light-emitting layer is sealedly packaged between the first substrate and the second substrate, to protect the organic light-emitting layer from humidity and collision. The first organic film layer formed on the first substrate can prevent ambient light or external light incident onto the organic light-emitting display panel from reflecting by the first organic film layer, thereby improving a display effect of the organic light-emitting display panel.

In the method for manufacturing the display panel, according to embodiments of the disclosure, since both the polyimide and the dichromatic organic dye have a light alignment property, the function of polarizer can be achieved by the polyimide doped with the dichromatic organic dye after light alignment; moreover, the polyimide has strong resistance to high temperature and high humidity, and the alignment of the polyimide can be achieved without stretching, in this way, the protecting film and the adhesive layer can be eliminated, thereby reducing the thickness of the polarizer, improving the reliability of the polarizer and avoiding the warping phenomenon of the polarizer, resulting in good durability of the polarizer.

Figure 7:
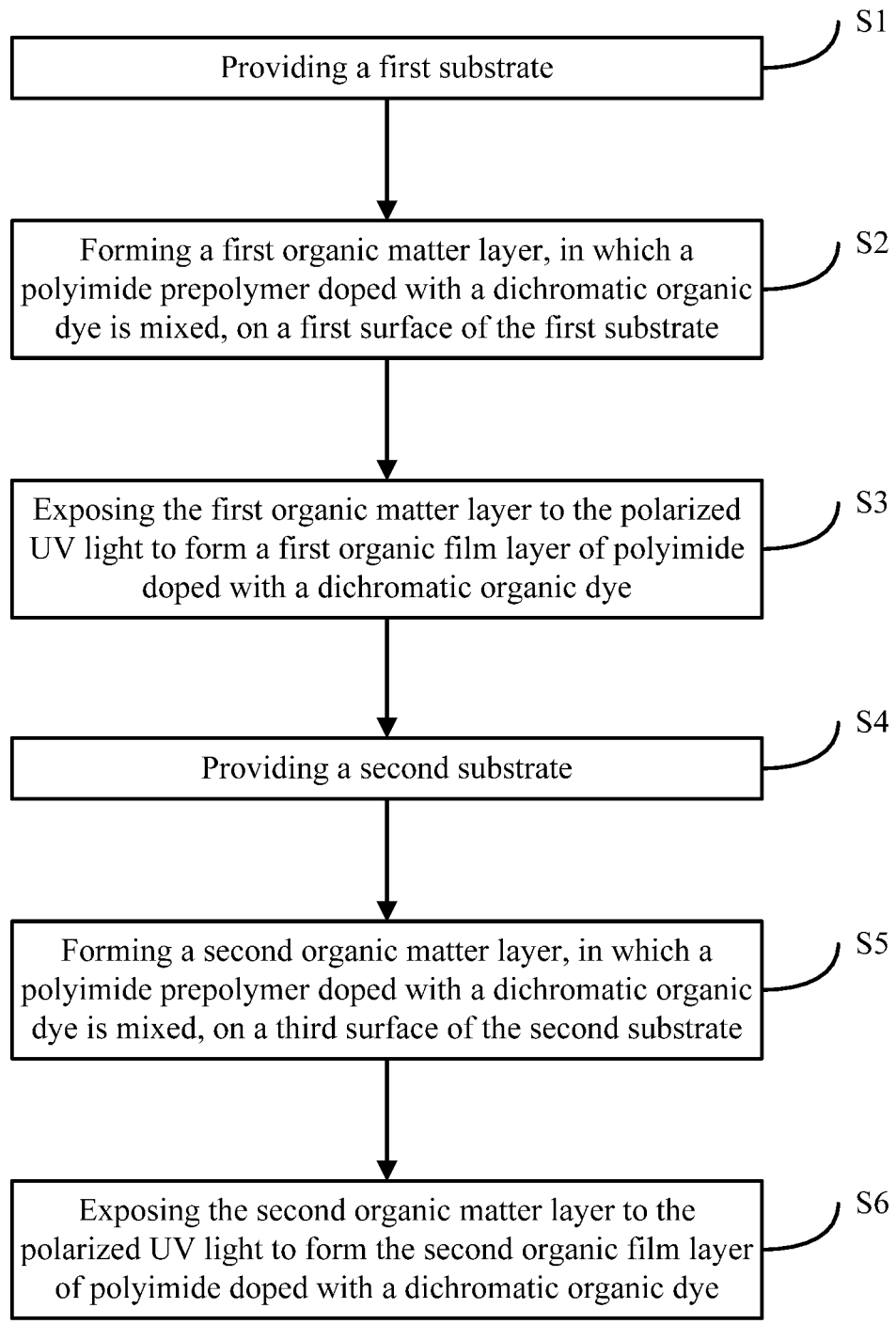
FIG. 7 is a flow chart of a method for manufacturing a display panel, according to embodiments of the disclosure.

FIG. 7 is a flow chart of a method for manufacturing a display panel, according to embodiments of the disclosure. With reference to the display panel shown in FIGS. 3 and 4A to 4D, the method for manufacturing the display panel may be adopted to manufacture a liquid crystal display panel. The method for manufacturing the display panel includes the following steps S1-S6.

In step S1, a first substrate is provided.

The first substrate may be a color filter substrate.

In Step S2, a first organic matter layer, in which a polyimide prepolymer doped with a dichromatic organic dye is mixed, is formed on a first surface of the first substrate.

A mixture of an organic matter and the polyimide prepolymer doped with a dichromatic organic dye is coated on the first surface of the first substrate to form the first organic matter layer. The polyimide prepolymer may be a prepolymer preliminarily polymerized by a pyromellitic acid dianhydride and an aromatic diamine in a solvent such as a dimethyl sulfoxide, and the polyimide prepolymer has a polymerization degree between a monomer and a final polymer and is a polymer having a low molecular weight.

In step S3, the first organic matter layer is exposed to the polarized UV light to form a first organic film layer of polyimide doped with a dichromatic organic dye.

The first organic matter layer is prebaked. For example, the prebaking is performed at a temperature in a range from 10° C. to 30° C. The pre-baked first organic matter layer is exposed to the polarized UV light, so that the dichromatic organic dye is orientationally aligned in the first organic matter layer. Energy of the polarized UV light is in a range from 300 mj to 1000 mj, for example in a range from 500 mj to 800 mj. In the case of such energy of the polarized UV light, the film of the polyimide has an optimum light alignment property, facilitating the orientational alignment of the azo dyes, in this way, an optimum polarization performance is achieved. Subsequently, the first organic matter layer subjected to the exposure to the polarized UV light is baked and cured, where the baking may be performed at a temperature in a range from 90° C. to 130° C. for 90 seconds to 120 seconds, and the curing may be performed at a temperature in a range from 210° C. to 230° C. for 20 minutes to 50 minutes. For example, the baking is performed at 130° C. for 120 seconds, or the curing is performed at 230° C. for 30 minutes.

In this step, since both the polyimide and the dichromatic organic dye have a light alignment property, a first organic film layer formed by exposing the first organic matter layer (in which the polyimide prepolymer doped with a dichromatic organic dye is mixed) to the polarized UV light has a polarization function.

In step S4, a second substrate is provided.

The second substrate may be an array substrate.

In step S5, a second organic matter layer, in which a polyimide prepolymer doped with a dichromatic organic dye is mixed, is formed on a third surface of the second substrate.

A mixture of an organic matter and the polyimide prepolymer doped with a dichromatic organic dye can be coated on the array substrate to form the second organic matter layer.

In step S6, the second organic matter layer is exposed to the polarized UV light to form the second organic film layer of polyimide doped with a dichromatic organic dye.

A through hole (not shown) may be formed in the second organic matter layer by patterning the second organic matter layer using a photolithographic process. The second organic matter layer formed with the through hole is exposed to the polarized UV light, so that the dichromatic organic dye is orientationally aligned in the second organic matter layer. The energy of the polarized UV light is in a range from 300 mj to 1000 mj, for example in a range from 500 mj to 800 mj. In the case of such energy of the polarized UV light, the film of the polyimide has an optimum light alignment property, facilitating the orientational alignment of the azo dyes, in this way, an optimum polarization performance is achieved. Subsequently, the second organic matter layer subjected to the exposure to the polarized UV light is baked and cured to form a second organic film layer having a polarization function. The baking may be performed at a temperature in a range from 90° C. to 130° C. for 90 seconds to 120 seconds, and the curing may be performed at a temperature in a range from 210° C. to 230° C. for 30 minutes to 60 minutes. For example, the baking is performed at 130° C. for 120 seconds, or the curing is performed at 230° C. for 40 minutes.

A thin-film transistor layer, a second organic film layer, a first transparent conductive film, an insulating layer and a second transparent conductive film may be formed in sequence on the array substrate. When the thin-film transistor layer includes a gate electrode layer, a gate insulating layer, a semiconductor layer and a source-drain metal layer, a through hole is formed in the second organic film layer by patterning the second organic film layer. A part of the source-drain metal layer is exposed by the through hole.

In some embodiments, the method for manufacturing the liquid crystal display device further includes a step S7.

In step S7, spacers are formed on the first organic film layer.

Particularly, a spacer layer is formed on the first organic film layer and is patterned to form the spacers, and then a liquid crystal box is formed after aligning and combining the first substrate and the second substrate. The spacers are spaced in the liquid crystal box to form the thickness of the liquid crystal box.

In embodiments, optionally, the first substrate is a color filter substrate, and the second substrate is an array substrate. A black matrix layer, a color filter layer and a first planarization layer are formed in sequence on the color filter substrate. The black matrix layer has a plurality of openings, and the color filter layer is formed in the openings of the black matrix layer. The first planarization layer is formed above the color filter layer and the black matrix layer. In some embodiments, the first planarization layer is embodied by the first organic film layer. Or the first organic film layer is formed on the first planarization layer. The first planarization layer and the first organic film layer may be doped organic matter layers.

A thin-film transistor layer, a second planarization layer, a first transparent conductive film, an insulating layer and a second transparent conductive film are formed in sequence on the array substrate. The thin-film transistor layer includes a gate electrode layer, a gate insulating layer, a semiconductor layer and a source-drain metal layer. In some embodiments, the second organic film layer is embodied as the second planarization layer. Alternatively, the second organic film layer is formed on the gate electrode layer, the gate insulating layer, the source-drain metal layer, the second planarization layer, the first transparent conductive film, the insulating layer or the second transparent conductive film. In this case, both the first organic film layer and the second organic film layer are formed in the liquid crystal box.

Alternatively, a black matrix layer, a color filter layer and a first planarization layer are formed in sequence on the color filter substrate. The black matrix layer has a plurality of openings. The color filter layer is formed in the openings of the black matrix layer. The first planarization layer is formed above the color filter layer and the black matrix layer. In some embodiments, the first planarization layer is embodied by the first organic film layer. Or the first organic film layer is formed above the first planarization layer. A thin-film transistor layer, a second planarization layer, a first transparent conductive film, an insulating layer and a second transparent conductive film are formed in sequence on a fourth surface of the array substrate opposite to the third surface. The thin-film transistor layer includes a gate electrode layer, a gate insulating layer, a semiconductor layer and a source-drain metal layer. In this case, the first organic film layer is formed in the liquid crystal box; and the second organic film layer is formed outside the liquid crystal box.

Alternatively, a black matrix layer, a color filter layer and a first planarization layer are formed in sequence on a second surface of the color filter substrate opposite to the first surface. The black matrix layer has a plurality of openings, the color filter layer is formed in the openings of the black matrix layer, and the first planarization layer is formed above a film including the color filter layer and the black matrix layer. In some embodiments, the first organic film layer is embodied as the first planarization layer, or the first organic film layer is formed above the first planarization layer. A thin-film transistor layer, a second planarization layer, a first transparent conductive film, an insulating layer and a second transparent conductive film are formed in sequence on the array substrate. The thin-film transistor layer includes a gate electrode layer, a gate insulating layer, a semiconductor layer and a source-drain metal layer. In some embodiments, the second organic film layer is embodied as the second planarization layer. Or the second organic film layer is formed between any adjacent two of the gate electrode layer, the gate insulating layer, the semiconductor layer, the source-drain metal layer, the second planarization layer, the first transparent conductive film, the insulating layer and the second transparent conductive film. In this case, the first organic film layer is formed outside the liquid crystal box; and the second organic film layer is formed in the liquid crystal box.

Alternatively, a black matrix layer, a color filter layer and a first planarization layer are formed in sequence on a second surface of the color filter substrate opposite to the first surface. The black matrix layer has a plurality of openings, and the color filter layer is formed in the openings of the black matrix layer. The first planarization layer is formed above a film including the color filter layer and the black matrix layer. A thin-film transistor layer, a second planarization layer, a first transparent conductive film, an insulating layer and a second transparent conductive film are formed in sequence on a fourth surface of the array substrate opposite to the third surface. The thin-film transistor layer includes a gate electrode layer, a gate insulating layer, a semiconductor layer and a source-drain metal layer. In this case, the first organic film layer and the second organic film layer are formed outside the liquid crystal box.

In the method for manufacturing the display panel, according to embodiments of the disclosure, since both the polyimide and the dichromatic organic dye have a light alignment property, the function of polarizer can be achieved by the polyimide doped with the dichromatic organic dye after light alignment; moreover, the polyimide has strong resistance to high temperature and high humidity, and the alignment of the polyimide can be achieved without stretching, in this way, the protecting film and the adhesive layer can be eliminated, thereby reducing the thickness of the polarizer, improving the reliability of the polarizer and avoiding the warping phenomenon of the polarizer, resulting in good durability of the polarizer.

Some embodiments and the applied technology principles of the disclosure have been described as above. It should be understood that the disclosure is not limited to particular embodiments described herein. Various changes, adjustments and alternations can be made without departing the scope of protection of the disclosure. In this way, although the disclosure is illustrated in detail through the above embodiments, the disclosure is not merely limited to the above embodiments, and can further include other equivalent embodiments without departing from the scope of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A display panel, comprising:
 a first substrate;
 a second substrate disposed opposite to the first substrate; and
 a first organic film layer disposed on the first substrate, and
 a second organic film layer disposed on the second substrate,
 wherein each of the first organic film layer and the second organic film layer is an organic film layer of polyimide doped with a dichromatic organic dye, the dichromatic organic dye is orientationally aligned in the first organic film layer and the second organic film layer by being exposed to polarized ultraviolet (UV) light, wherein the first organic film layer is disposed on an inner side of the first substrate, and the second organic film layer is disposed on an inner side of the second substrate,
 wherein the display panel is a liquid crystal display panel, the first substrate is a color filter substrate, and the second substrate is an array substrate,
 wherein the display panel further comprises:
 a liquid crystal layer disposed between the first substrate and the second substrate;
 spacers formed between the first substrate and the second substrate;
 a frame sealant adhering to the first substrate and the second substrate to form a liquid crystal box together with the first substrate and the second substrate;
 a black matrix and color filters, which are disposed on the inner side of the first substrate;
 a thin-film transistor layer and a first transparent conductive film, which are disposed on the second substrate, and the thin-film transistor layer and the first transparent conductive film are disposed between the liquid crystal layer and the second substrate;
 wherein the first organic film layer is disposed between the liquid crystal layer and a film layer comprising the color filters and the black matrix, and the first organic film layer is directly in contact with the liquid crystal layer; and
 wherein the second organic film layer is disposed between the thin-film transistor layer and the first transparent conductive film, and the second organic film layer is directly in contact with the thin-film transistor layer.

2. The display panel of claim 1, wherein the dichromatic organic dye is an organic dye having a dichroic ratio greater than 7.

3. The display panel of claim 1, wherein the first organic film layer forms a first planarization layer, and the second organic film layer forms a second planarization layer.

4. The display panel of claim 3, wherein the black matrix has a plurality of openings, the color filters are disposed in the openings of the black matrix, respectively; and
 the thin-film transistor layer, the second organic film layer, the first transparent conductive film, an insulating layer, and a second transparent conductive film are disposed on the array substrate in sequence in a direction from the array substrate to the color filter substrate, and in the direction from the array substrate to the color filter substrate, the first organic film layer is disposed over the second transparent conductive film, wherein the thin-film transistor layer comprises a gate electrode layer, a gate insulating layer, a semiconductor layer and a source-drain metal layer.

5. A method for manufacturing a display panel, wherein the display panel comprises:
 a first substrate;
 a second substrate disposed opposite to the first substrate;
 a first organic film layer disposed on the first substrate, and
 a second organic film layer disposed on the second substrate, wherein each of the first organic film layer and the second organic film layer is an organic film layer of polyimide doped with a dichromatic organic dye, the dichromatic organic dye is orientationally aligned in the first organic film layer and the second organic film layer, wherein the first organic film layer is disposed on an inner side of the first substrate, and the second organic film layer is disposed on an inner side of the second substrate,
 wherein the display panel is a liquid crystal display panel, the first substrate is a color filter substrate, and the second substrate is an array substrate,
 wherein the display panel further comprises:
 a liquid crystal layer disposed between the first substrate and the second substrate;
 spacers formed between the first substrate and the second substrate;
 a frame sealant adhering to the first substrate and the second substrate to form a liquid crystal box together with the first substrate and the second substrate;
 a black matrix and a color filter, which are disposed on the inner side of the first substrate;
 a thin-film transistor layer and a first transparent conductive film, which are disposed on the second substrate, and the thin-film transistor layer and the first transparent conductive film are disposed between the liquid crystal layer and the second substrate;
 wherein the first organic film layer is disposed between the liquid crystal layer and a film layer comprising the color filters and the black matrix, and the first organic film layer is directly in contact with the liquid crystal layer;

wherein the second organic film layer is disposed between the thin-film transistor layer and the first transparent conductive film, and the second organic film layer is directly in contact with the thin-film transistor layer;

wherein the method comprises:

forming the first substrate;

forming a first organic matter layer on a first surface of the first substrate, wherein a polyimide prepolymer doped with the dichromatic organic dye is mixed in the first organic matter layer;

exposing the first organic matter layer to polarized UV light to form the first organic film layer of polyimide doped with the dichromatic organic dye;

forming the second substrate;

forming a second organic matter layer on a third surface of the second substrate, wherein a polyimide prepolymer doped with the dichromatic organic dye is mixed in the second organic matter layer; and exposing the second organic matter layer to polarized UV light to form the second organic film layer of polyimide doped with the dichromatic organic dye; thereby forming the display panel.

6. The method of claim 5, wherein the dichromatic organic dye is an organic dye having a dichroic ratio greater than 7.

7. The method of claim 5, wherein the black matrix layer, the color filter layer and a first planarization layer are formed in sequence on the color filter substrate, wherein the black matrix layer has a plurality of openings, the color filter layer is formed in the openings of the black matrix layer, and the first planarization layer is formed above the color filter layer and the black matrix layer; and the thin-film transistor layer, a second planarization layer, the first transparent conductive film, an insulating layer and a second transparent conductive film are formed in sequence on the array substrate, wherein the thin-film transistor layer comprises a gate electrode layer, a gate insulating layer, a semiconductor layer and a source-drain metal layer.

8. The method of claim 7, wherein the second organic film layer is formed on the gate electrode layer, the gate insulating layer, and the source-drain metal layer.

9. The method of claim 7, wherein forming the second organic matter layer, in which the polyimide prepolymer doped with the dichromatic organic dye is mixed, on the third surface of the second substrate comprises:

coating a mixture of an organic matter and the polyimide prepolymer doped with the dichromatic organic dye on the third surface of the second substrate to form the second organic matter layer.

10. The method of claim 9, wherein exposing the second organic matter layer to polarized UV light to form the second organic film layer of the polyimide doped with the dichromatic organic dye comprises:

patterning the second organic matter layer to form a through hole;

exposing the second organic matter layer formed with the through hole to polarized UV light, so that the dichromatic organic dye is orientationally aligned in the second organic matter layer; and curing the second organic matter layer by baking after the exposure of the second organic matter layer to the polarized UV light is completed.

11. The method of claim 10, wherein energy of the polarized UV light is in a range from 300 mj to 1000 mj, the baking is performed at a temperature in a range from 90° C. to 130° C. for 90 seconds to 120 seconds, and the curing is performed at a temperature in a range from 210° C. to 230° C. for 30 minutes to 60 minutes.

12. The method of claim 5, wherein the black matrix layer, the color filter layer and a first planarization layer are formed in sequence on a second surface of the color filter substrate opposite to the first surface, wherein the black matrix layer has a plurality of openings, the color filter layer is formed in the openings of the black matrix layer, and the first planarization layer is formed above a film comprising the color filter layer and the black matrix layer, and the thin-film transistor layer, a second planarization layer, the first transparent conductive film, an insulating layer and a second transparent conductive film are formed in sequence on a fourth surface of the array substrate opposite to the third surface, wherein the thin-film transistor layer comprises a gate electrode layer, a gate insulating layer, a semiconductor layer and a source-drain metal layer.

13. The method of claim 5, wherein forming the first organic matter layer, in which the polyimide prepolymer doped with the dichromatic organic dye is mixed, on the first surface of the first substrate comprises:

coating a mixture of an organic matter and the polyimide prepolymer doped with the dichromatic organic dye on the first surface of the first substrate to form the first organic matter layer.

14. The method of claim 13, wherein exposing the first organic matter layer to polarized UV light to form the first organic film layer of polyimide doped with the dichromatic organic dye comprises:

prebaking the first organic matter layer;

exposing the prebaked first organic matter layer to polarized UV light, so that the dichromatic organic dye is orientationally aligned in the first organic matter layer; and curing the first organic matter layer by baking after the exposure of the first organic matter layer to the polarized UV light is completed.

15. The method of claim 14, wherein the prebaking is performed at a temperature in a range from 90° C. to 130° C., energy of the polarized UV light is in a range from 300 mj to 1000 mj, the baking is performed at a temperature in a range from 90° C. to 130° C. for 90 seconds to 120 seconds, and the curing is performed at a temperature in a range from 210° C. to 230° C. for 20 minutes to 50 minutes.

16. The method of claim 5, wherein after exposing the first organic matter layer to polarized UV light to form the first organic film layer of polyimide doped with the dichromatic organic dye, the method further comprises:

forming the spacers above the first organic film layer.

* * * * *